Figure 1:
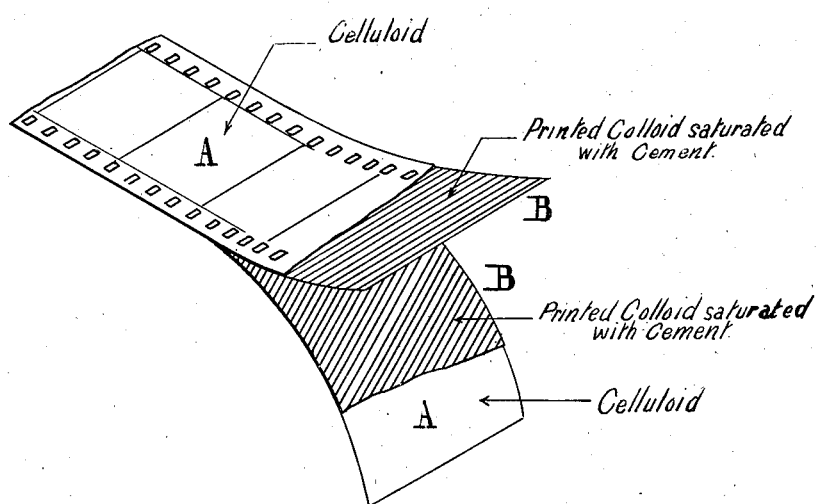

May 22, 1928.  1,670,672
J. E. THORNTON
CONSTRUCTION AND MANUFACTURE OF MULTILAYER CINEMATOGRAPH AND OTHER FILMS
Filed March 24, 1926

INVENTOR.
J. E. Thornton

Patented May 22, 1928.

1,670,672

UNITED STATES PATENT OFFICE.

JOHN EDWARD THORNTON, OF WEST HAMPSTEAD, LONDON, ENGLAND.

CONSTRUCTION AND MANUFACTURE OF MULTILAYER CINEMATOGRAPH AND OTHER FILMS.

Application filed March 24, 1926, Serial No. 97,138, and in Great Britain April 17, 1925.

This invention is an improvement upon the method of joining together films as described in my patent application Serial No. 756,168, filed Dec. 15, 1924 and provides an improved process and method for joining together face-to-face (printed-gelatine to printed-gelatine) two thin component films forming part of a cinematograph film constructed according to any of the following inventions:—Serial No. 608,511 filed Dec. 13, 1923; No. 35,759 filed June 8, 1925; No. 711,251 filed May 5, 1924; 720,127 filed June 14, 1924; No. 711,252 filed May 5, 1924; 711,253 filed May 5, 1924; No. 66,604 filed Nov. 3, 1925; No. 711,255 filed May 5, 1924; No. 40,961 filed July 1, 1925; No. 60,346 filed Oct. 3, 1925, which describes a film formed by building up from two thin films cemented together.

In all these inventions the face-to-face joint has preferably been made by the process described in Thornton application Serial No. 756,168 filed Dec. 15, 1924 in which a cement of a colloidal nature was amalgamated with the printed colloid face of each film by a process consisting partly of physical interlocking by impregnation with a cement and partly of mechanical interlocking, and thereafter the two films were joined together by the application of pressure and heat, permanent amalgamation being completed by a final process of insolubilization.

Prior to the process described in specification Serial No. 756,168 filed Dec. 5, 1924 it has been extremely difficult to form reliable and permanent joints between two printed faces of material, and by the use of the present process such joints are still more easily made.

The invention can also be used for joining films of other (non-cinematograph) descriptions.

The present invention.

The present invention comprises a simplified process based partly upon the same principle as described in specification Serial No. 756,168 filed Dec. 15, 1924, but without the roughening of the film and mechanical interlocking of the faces therein used, and is limited to physical amalgamation alone.

The present process depends upon forming, as the first step, a physical union of the gelatine faces of the two films by cement alone, but applied in a particular way, this union being of such character that it serves the temporary purpose of allowing accurate assembling and joining of the film; but such physical union is not good enough to serve as a permanent joint capable of standing the strains of use in a cinematograph projector until the second step of the process has been carried out. This second step consists in rendering the joint insoluble and permanent, preferably by the reaction of a bichromate salt upon both the cement and the gelatine faces, and which is started by their exposure to light after their gelatine bodies have been impregnated with a solution made of the salt. Alternatively this insolubilization may be effected by the reaction of other hardeners such as chrome alum or the like, which will gradually insolubilize the cement and the gelatine faces without exposure to light.

Fig. 1. is a view of film comprising two celluloid layers A and two printed colloid layers B each of which is saturated with the cement.

In the following description of the method of carrying the invention into effect it is assumed that two films to be joined have already been printed, developed or otherwise treated in order to complete the prints, and that their gelatine faces are now ready for the jointing processes. It is also assumed that the two films have already been perforated, either with a single registration hole for each section-picture and either with or without the usual set of traction perforations, or else alternatively that they have already been perforated with the standard or other form of perforations that will be used for traction and registration combined.

The gelatine layer B of each film must be carried upon a suitable support A of sufficient strength to allow of easy handling during the operations. In films of the type described in the first paragraph of this specification this necessary support is already provided by the celluloid backing of the ordinary film, or by the paper and celluloid backing of the reinforced type of film. But if necessary such layers are first attached to a temporary support, which may for example comprise a continuous strip or an endless belt of strong prepared paper, artificial leather cloth, celluloid, metal, or the like rendered sufficiently adhesive with a coating of rubber solution, gutta percha, or other suitable medium.

The approximate thickness of each of the layers A forming the celluloid supports is approximately $\frac{2}{1000}$ inch thick and of each of the printed gelatine layers B $\frac{1}{1000}$ inch thick, so that the thickness of the final film is approximately $\frac{6}{1000}$ inch thick.

According to this invention the first step of the process consists in saturating the gelatine layer of each printed film with a solution of an adhesive until it has completely penetrated the entire body of gelatine and until the gelatine will absorb no more.

The adhesive comprises a gumming agent, a hygroscopic agent, a hardening or insolubilizing agent and an acid and may be composed as follows:—

| | Ounces or parts by weight. |
|---|---|
| Best quality pale glue | 100 |
| Glacial acetic acid | 50 |
| Molasses or glycerine | 10 |
| Ammonium bichromate | 1 |
| Water | 100 |

The glue is soaked in 90 parts of water until soft, then melted by gently heating in a jacketed vessel and the molasses or glycerine is added with constant stirring. The bichromate is dissolved in 10 parts of warm water and gradually added to the glue solution with constant stirring. Finally the acetic acid is added, the whole thoroughly mixed by constant stirring, and then, after filtering, the cement is ready for use.

Variations of the ingredients named may be made provided they produce similar effects. For instance fish-glue may be substituted for pale glue, sugar for molasses or glycerine, sulphuric or other suitable acid for acetic, and the proportions of each ingredients of the cement may be adjusted to suit these alternative ingredients. The proportions of solids to liquids may also be varied or adjusted to suit the particular grade of gelatine composing the film layers. The proportions given above are an example of a mixture suitable for an average case but the invention is not restricted thereto.

Having saturated both films with the adhesive they are then allowed to dry, preferably in a room or chamber fed with dust-filtered and warmed air by means of a fan. The molasses or glycerine contained within the body of the gelatine layers will prevent them becoming absolutely dry, but they will be sufficiently dry for purposes of handling, especially upon the surface.

In this state the two films are then passed into the assembling and uniting machine whereby they are accurately superimposed and registered by means of the registration pins which enter the registration holes in both films, thus bringing the component parts of their images into perfect register.

At the next step of the operation by this machine the two films are pressed together between heated metal blocks or heated metal rollers, whilst the two faces of the two films are united owing to the glue which is kept moist by the molasses or glycerine becoming slightly melted, so that the two parts are literally "fused" together as one; the process being concluded by the recooling of the film, which may be assisted if necessary by a blast of cold air directed upon the amalgamated films as they emerge from the squeezing blocks or rolls.

This brings the process down to the stage at which a very good physical union of the two film surfaces has been effected. But if the cemented film were to be used in that condition the two thin films composing it could be readily separated again upon the application of heat, such for example as the heat of a hot lamp of a cinematograph projector.

The next step therefore is to convert this still fusible temporary joint into a non-fusible, hardened, insoluble permanent joint.

Where a small proportion of a bichromate salt has been incorporated in the cement, as in the example already given, this condition is brought about by exposing the film to a source of light, for example a mercury-vapour lamp or an arc-lamp, against which the film is passed as it slowly travels in its passage to the winding reel. By this means a hardening and insolubilizing action is started, by which the glue of the cement and the gelatine layers into which it has soaked are all rendered more or less insoluble to any further application of heat, the degree of insolubility being a continuing and increasing one, after the action has once been started by light, until the limit of insolubility is reached.

In the above process the film is very slightly colored by the bichromate and this is not detrimental to the picture when being projected. But if the pale yellow tint is objected to it can be avoided by substituting for the bichromate some hardening salt which does not require the action of light to set up the necessary reaction. An example of such hardening salt is chrome alum. This may be substituted for the bichromate in the formula given, and in about the same amount. No light action is necessary as the glue and gelatine will both become more or less hard or insoluble in time, but the hardening process will take much longer, and although the result is good, it is less satisfactory than when bichromate and light are used.

The united film will now have formed a single film, and owing to the minute quantity of moisture still retained in the film (owing to the molasses or glycerine remaining) the gelatine layers will retain their suppleness and the combined film will possess the necessary flexibility notwithstanding the number of its layers, and its component parts will not become separated by severe and prolonged use.

Modifications.

A similar result is obtained and an equally good joint is made if the insolubilizing bichromate salt or chrome alum is omitted from the cementing mixture, the cement being allowed to soak into the gelatine body of each film first, and the insolubilizing salt made up as a separate solution which is applied to the gelatine body after the cement solution has soaked in, after which the gelatine is dried and the processes continued in the manner hereinbefore described.

The term "gelatine" used hereinbefore and in the claims is intended to cover and include any other non-waterproof colloid that may prove suitable as an alternative to gelatine.

The term "celluloid" used hereinbefore and in the claims is intended to cover and include any other transparent waterproof material that can be used as an effective substitute therefor.

What I claim as my invention and desire to protect by Letters Patent is:—

1. A process for amalgamating and joining together two printed colloid films which consists in saturating each printed colloid film separately with a liquid cement, containing a gluing agent of a colloid character, a hygroscopic agent, an acid and an insolubilizing agent, drying each saturated film separately; superimposing the two printed saturated and dried films with the printed face of one film upon the printed face of the other film; clamping and squeezing the two films together; applying heat to melt the cement in each film and cause the cement in the two films to fuse together; cooling the cement thus forming a temporary, but still fusible joint between the two films; and finally converting the fusible temporary joint into a non-fusible permanent joint by the gradual action of the hardening and insolubilizing agent contained in the cement; thus producing a single-film the two parts of which are permanently and indissolubly united with the printed images inside the film.

2. A process for amalgamating and joining together two printed-colloid films which consists in saturating each printed colloid film separately with a liquid cement, containing a gluing agent of a colloid character, a hygroscopic agent, an acid and an insolubilizing agent; drying each saturated film separately, superimposing the two printed saturated and dried films with the printed face of one film upon the printed face of the other film; clamping and squeezing the two films together; applying heat to melt the cement in each film and cause the cement in the two films to fuse together; cooling the cement thus forming a temporary, but still fusible joint between the two films, and finally converting the fusible temporary joint into a non-fusible permanent joint by the action of light on the hardening and insolubilizing agent contained in the cement; thus producing a single film the two parts of which are permanently and indissolubly united with the printed images inside the film.

In testimony whereof I have hereunto set my hand.

JOHN EDWARD THORNTON.